United States Patent
Kang et al.

(10) Patent No.: US 10,424,915 B2
(45) Date of Patent: Sep. 24, 2019

(54) SECONDARY PROTECTION WITH PERMANENT DISABLE FOR A BATTERY

(71) Applicant: LITTELFUSE, INC., Chicago, IL (US)

(72) Inventors: Sam S. Kang, Pleasanton, CA (US);
John M. Jorgensen, Reno, NV (US);
Bharat Shenoy, San Jose, CA (US);
Kunghao Yu, Taipei (TW)

(73) Assignee: Littelfuse, Inc., Chicago, IL (US)

( * ) Notice: Subject to any disclaimer, the term of this patent is extended or adjusted under 35 U.S.C. 154(b) by 501 days.

(21) Appl. No.: 14/593,128

(22) Filed: Jan. 9, 2015

(65) Prior Publication Data

US 2015/0200537 A1 Jul. 16, 2015

Related U.S. Application Data

(60) Provisional application No. 61/926,707, filed on Jan. 13, 2014.

(51) Int. Cl.
*H02H 7/18* (2006.01)
*H02J 7/00* (2006.01)
*H01M 2/34* (2006.01)

(52) U.S. Cl.
CPC ............ *H02H 7/18* (2013.01); *H02J 7/0031* (2013.01); *H01M 2/34* (2013.01); *H02J 7/0078* (2013.01); *H02J 7/0086* (2013.01); *H02J 7/0091* (2013.01); *H02J 2007/004* (2013.01); *H02J 2007/0039* (2013.01)

(58) Field of Classification Search
CPC ...................................................... H02H 7/18

USPC .......................................................... 320/134
See application file for complete search history.

(56) References Cited

U.S. PATENT DOCUMENTS

| | | | | |
|---|---|---|---|---|
| 5,703,463 A * | 12/1997 | Smith | ................... | H01M 10/46 320/134 |
| 6,791,809 B2 * | 9/2004 | Pannwitz | ............... | H02J 7/0031 361/90 |
| 7,079,003 B2 * | 7/2006 | Furuta | ...................... | H02H 7/18 337/184 |
| 7,667,435 B2 * | 2/2010 | Denning | ............... | H01M 10/42 320/132 |
| 8,618,805 B2 * | 12/2013 | Li | ........................ | H01M 10/441 320/149 |
| 8,649,140 B2 * | 2/2014 | Peterson | ............... | H02J 7/0031 361/78 |
| 2012/0224289 A1 | 9/2012 | Peterson | | |

FOREIGN PATENT DOCUMENTS

| | | | |
|---|---|---|---|
| JP | H09298844 A | 11/1997 |
| JP | H09312172 A | 12/1997 |
| JP | 2010068618 A | 3/2010 |
| JP | 2010178402 A | 8/2010 |
| JP | 2011172475 A | 9/2011 |

* cited by examiner

*Primary Examiner* — Jerry D Robbins (57) ABSTRACT

Secondary battery protection circuits for protecting a battery from charging and/or discharging faults are provided. A secondary battery protection circuit may include a first terminal and a second terminal, a transistor electrically connected between the first terminal and the second terminal, a fuse electrically coupled to the gate of the transistor, and a fuse control circuit configured to cause current sufficient to open the fuse to pass through the fuse in the event of a fault condition.

15 Claims, 10 Drawing Sheets

START
1002

↓

PROVIDE/SEND A VOLTAGE (E.G., A HIGH VOLTAGE) CONTROL SIGNAL BY A FUSE CONTROL CIRCUIT TO A GATE OF A TRANSISTOR THAT IS ELECTRICALLY CONNECTED BETWEEN A FIRST TERMINAL AND A SECOND TERMINAL FOR TURNING ON THE TRANSISTOR
1004

↓

ALLOW A CURRENT TO FLOW FROM THE FIRST TERMINAL TO A BATTERY UPON THE TRANSISTOR TURNING ON
1006

↓

DETECT A FAULT CONDITION (E.G., A CHARGING FAULT) IN THE BATTERY AND PROVIDE A SIGNAL TO THE FUSE CONTROL CIRCUIT INDICATING THE DETECTED FAULT CONDITION
1008

↓

DISABLE THE CURRENT FLOWING FROM THE FIRST TERMINAL TO THE BATTERY BY PASSING A SUFFICIENT AMOUNT OF CURRENT THROUGH THE FUSE CONNECTED TO THE GATE TO OPEN THE FUSE IN THE EVENT OF THE FAULT CONDITION
1010

↓

END
1012

FIG. 10

SECONDARY PROTECTION WITH PERMANENT DISABLE FOR A BATTERY

CROSS-REFERENCE TO RELATED APPLICATION

This application claims the benefit of U.S. provisional patent application Ser. No. 61/926,707, filed Jan. 13, 2014, titled "Secondary Battery Protection with Permanent Disable," the entirety of which application is incorporated by reference herein.

FIELD OF THE DISCLOSURE

This disclosure relates generally to the field of circuit protection devices and more particularly to circuits for protecting battery packs.

BACKGROUND OF THE DISCLOSURE

A variety of modern electronic devices include a battery to supply power to the electronic device. Often, these batteries are rechargeable. For example, laptops, tablet computers, smart phones, and other such devices include a rechargeable battery. As such, a user may charge the device, or rather; charge the battery, and the battery can be used to supply power to the device during periods where other sources of power might not be readily available or convenient to use.

Rechargeable batteries used in such electronic devices include those having a number of secondary cells. For example, lithium-ion and lithium-ion polymer batteries include a number of secondary cells. Each of the secondary cells includes a positive and negative electrode, separated by an ion permeable material. The secondary cells may be electrically connected (e.g., in parallel) and enclosed in a metal case or disposed in a pouch to form a "battery pack." A benefit of lithium based secondary cells is their ability to be repeatedly charged and discharged as well as their high volumetric energy densities.

As will be appreciated, however, lithium based rechargeable batteries have narrow tolerance values for charging, discharging, and operating temperature. Said differently, lithium based battery packs should not be overheated, overcharged, or discharged past a specific limit. In extreme cases of overheating or overcharge, the battery pack can rupture and/or combust. Furthermore, when the battery pack is discharged past a specific limit, it may be unusable and/or unsafe to recharge. As such, these battery packs demand a number of safety measures to prevent failures and ensure safety during operation. Accordingly, such battery packs are usually provided with a battery protection circuit for reducing and/or preventing over-charging, over-discharging, and out of temperature operation of the secondary cells.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

There is a need for a secondary protection circuit for protecting a battery pack that provides precise control of permanently disconnecting the battery pack from the charger and/or the load. Said differently, there is a need for a secondary protection circuit that is less dependent upon external conditions (e.g., temperature, power supply levels, or the like) to function.

Various examples provide secondary battery pack protection circuit. The secondary battery pack protection circuit may include a first terminal and a second terminal, a transistor electrically coupled between the first terminal and the second terminal, a fuse electrically coupled to the gate of the transistor, and a fuse control circuit configured to cause current sufficient to open the fuse to pass through the fuse in the event of a fault condition.

Various examples provide secondary battery pack protection circuit. The secondary battery pack protection circuit may include a first terminal and a second terminal, a discharge switch electrically coupled to the first terminal, a charge switch electrically coupled to the discharge switch and the second terminal, and a control circuit including a first fuse electrically coupled to the discharge switch to permanently turn the discharge switch off in the event that the first fuse opens, a second fuse electrically coupled to the charge switch to permanently turn the charge switch off in the event that the second fuse opens, and a fuse control circuit configured to cause current sufficient to open the first fuse to pass through the first fuse in the event of a discharging fault condition and to cause current sufficient to open the second fuse to pass through the second fuse in the event of a charging fault.

With some examples, various embodiments may provide a secondary battery pack protection circuit where a fuse is placed inside the controller integrated circuit (IC). The fuse inside the controller IC may be smaller compared to conventional fuses in secondary battery protection circuits as the current level through this fuse may be orders of magnitude smaller than the current flowing into and out of the battery pack. As such, opening the fuse may be quicker and more accurate than prior techniques. Furthermore, components necessary in prior art devices (e.g., two big fuses with two resistors) may be removed, which can save the cost and hassle of assembly.

Various examples provide at least one method of operation of a secondary battery protection circuit electrically connected to a primary battery protection circuit to provide protection to the battery. The method comprising providing a voltage signal by a fuse control circuit to a gate of a transistor that is electrically connected between a first terminal and a second terminal for turning on the transistor; allowing a current to flow from the first terminal to a battery upon the transistor turning on; detecting a fault condition in the battery and providing a signal to a fuse control circuit indicating the fault condition was detected; and disabling the current flowing from the first terminal to the battery by passing a sufficient amount of the current through a fuse connected to the gate to open the fuse in the event of a fault condition using the fuse control circuit.

BRIEF DESCRIPTION OF THE DRAWINGS

By way of example, specific embodiments of the disclosed device will now be described, with reference to the accompanying drawings, in which.

DETAILED DESCRIPTION

The present disclosure will now be described more fully hereinafter with reference to the accompanying drawings, in which preferred embodiments are shown. Protection circuits, however, may be embodied in many different forms and should not be construed as limited to the embodiments set forth herein. Rather, these embodiments are provided so that this disclosure will be thorough and complete, and will fully convey the scope of the protection circuits described herein to those skilled in the art. In the drawings, like numbers refer to like elements throughout.

As described herein, various embodiments of the present disclosure provide a secondary battery pack protection circuit. The secondary battery pack protection circuit may include a first terminal and a second terminal, a transistor electrically coupled between the first terminal and the second terminal, a fuse electrically coupled to the gate of the transistor, and a fuse control circuit configured to cause current sufficient to open the fuse to pass through the fuse in the event of a fault condition.

The secondary protection circuit may be included with a primary protection circuit to protect a battery pack. For example, various embodiments of the present disclosure may be provided to protect a lithium-ion or a lithium-ion polymer battery pack. The secondary protection circuits described herein may be provided to permanently disconnect a battery pack from a charger and/or or a load in the event that the primary protection circuit does not disconnect the battery during a fault condition. The protection circuit includes a primary protection integrated circuit (IC), which controls the charging and discharging of the battery pack as well as protection of the battery pack in cases of over-charge or over-discharge. The primary protection IC controls transistors to electrically disconnect the battery pack from the charger or the load.

Safety testing of the protection circuit may include a single component fault method where the primary protection device is removed and the battery pack is observed to determine if the battery pack can still stabilize into a safe condition after a fault is applied. One example of this is "abusive overcharge" testing where a dangerous overvoltage condition is applied to the battery pack when the transistor used to disconnect the charger is shorted, which removes the ability of the primary protection IC to function as intended.

In order to successfully pass an abusive overcharge test, the battery pack may include a secondary protection mechanism to provide protective functions when the primary protection IC is faulted. This secondary protection mechanism may be used to provide a permanent disconnection of the battery pack from the charger and/or load. The reasoning is that since abusive overcharge can be so dangerous to lithium based secondary cells, it is safer to permanently disable the battery pack if a fault like this occurs. Accordingly, protection circuits may also include a secondary protection IC, which controls a fuse or a thermal cutoff mechanism to permanently disable (e.g., electrically disconnect) the battery pack from the charging circuit in cases of an abusive overcharge.

Figure 1:
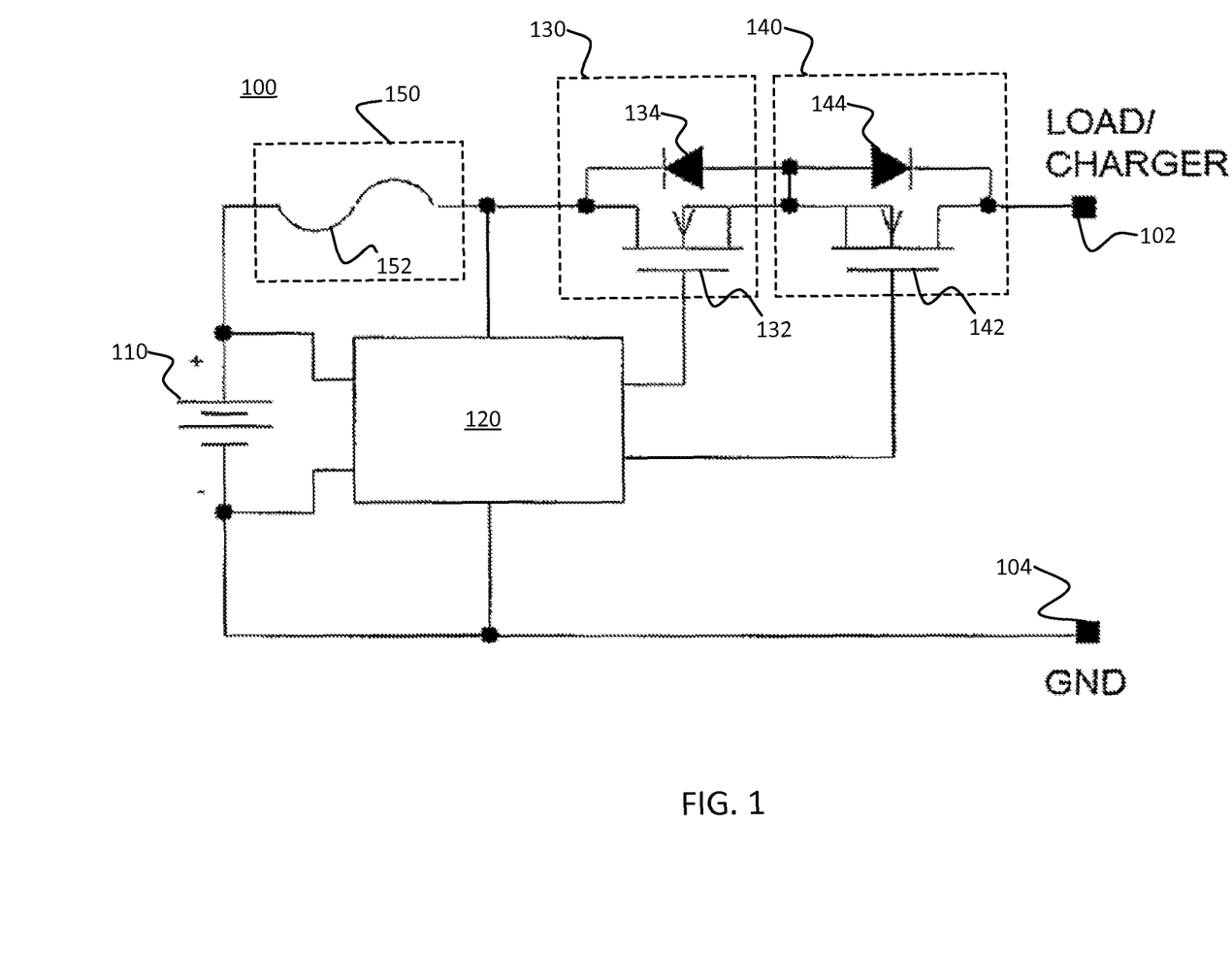
FIG. 1 is a block diagram of a battery protection circuit including a secondary protection circuit.

FIG. 1 illustrates an example battery protection circuit 100 for protecting a battery 110. Terminals 102 and 104 are provided to electrically connect the battery 110 to a charger or a load (e.g., electronic device). The protection circuit 100 includes a control IC 120 for controlling a discharge switch 130 and a charge switch 140. Each of the discharge switches, such as discharge switch 130 and charge switch 140, includes a transistor 132, 142 (e.g., MOSFET, or the like) and diodes 134, 144. The diodes 134, 144 are electrically connected across the source and the drain of the transistor 132, 142. During normal charging/discharging operation, the control IC 120 turns on both the switches 130 and 140 (e.g., by applying a high voltage to the gates of the transistors 132, 142 to turn them on.)

Whenever a charging fault is detected (e.g., over-voltage event, over-current event, over temperature event, or the like) the control IC 120 turns off the charging switch 140 (e.g., by turning off the transistor 142) to stop charging the battery 110. Discharging current, however, is still allowed to flow through the discharge switch 130 and the diode 144 of the charge switch 140. Whenever a discharging fault is detected (e.g., under-voltage, over-current, over-temperature, or the like) the control IC 120 turns off the discharge switch 130 to stop discharging the battery 110. Charging current, however, is still allowed to flow through the charge switch 140 and the diode 134 of the discharge switch 130.

The protection circuit 100 also includes a secondary protection circuit 150, which acts as a secondary protection mechanism and when activated stops charging and/or discharging by permanently electrically disconnecting the battery 110 from the terminal 102. For example, if the control IC 120 fails to turn off one of the switches 130, 140 during a fault condition, the secondary protection circuit 150 may activate to permanently disconnect the battery 110 from the terminal 102. As shown in FIG. 1, the secondary protection circuit 150 may include a fuse 152. The secondary protection circuit 150 may instead include other protection devices (e.g., positive temperature coefficient thermistors, or the like.) A disadvantage to the secondary protection circuit 150, however, is that a large amount of current is necessary to cause the fuse 152 to open. Furthermore, a certain amount of time lag is experienced between when a fault condition occurs and when the fuse 152 opens. Accordingly, the battery pack 110 may be exposed to the dangerous condition during this time period.

Figure 2:
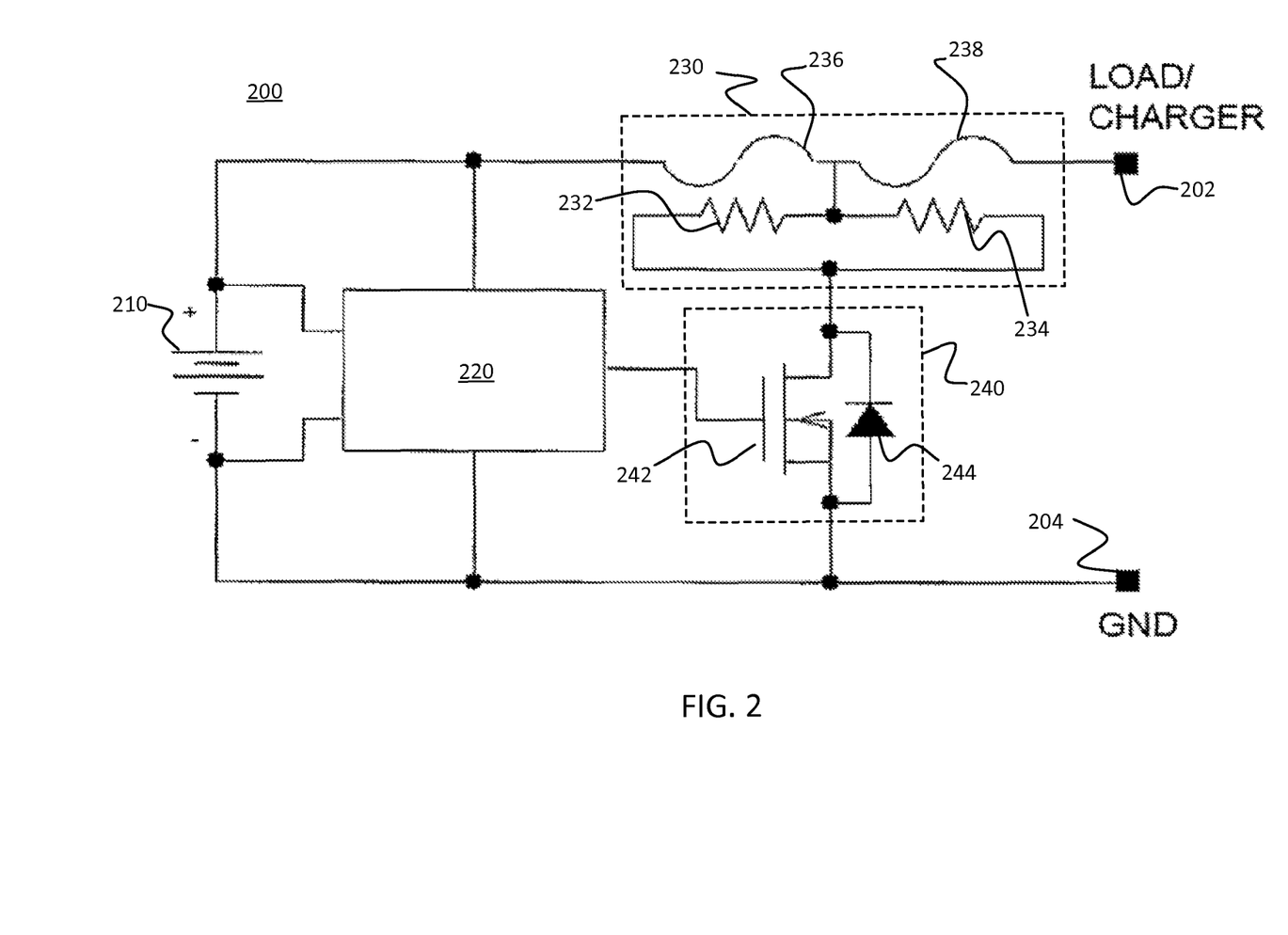
FIG. 2 is a block diagram of a secondary protection circuit.

FIG. 2 illustrates an example of a secondary protection circuit 200, which may be substituted for the secondary protection circuit 150 in FIG. 1. The secondary protection circuit 200 includes terminals 202 and 204 for connecting the secondary protection circuit 200 into the primary protection circuit (e.g., 100).

A permanent disconnect circuit 230 for permanently electrically disconnecting the terminal 202 from the terminal 204 and a switch 240 for activating the permanent disconnect circuit 230 are also provided. The permanent disconnect circuit 230 includes resistors 232, 234 packaged with fuses 236, 238. The switch 240 includes a transistor 242 and a diode 244. A secondary control IC 220 is provided to monitor the battery pack 210 for fault conditions and turn on the switch 240 when such fault conditions are detected. For example, when secondary control IC 220 detects a fault (e.g., abnormal voltage, current, or temperature) it turns the transistor 242 on in the switch 240. As the transistor 242 is now turned on, current flows through the resistors 232, 234 of the permanent disconnect circuit 230. The heat generated by the resistors 232, 234 opens one or both of the fuses 236, 238, thereby permanently disconnecting the battery pack 210 from the terminal 202.

The secondary protection circuit 200 allows for greater control of opening than the secondary protection circuit 150 described in FIG. 1. Said differently, as a fuse (e.g., the fuse 152) may require and/or necessitate a significant amount of current over its rated current to open, this could lead to slower opening times. The secondary protection circuit 200, however, still uses thermal fuse technology, which has overall slower reaction times compared to, for example, transistors. Furthermore, the heat generated by the resistors 232, 234 can vary with different battery/charger voltage and environment temperature. As such, even if an over-voltage, over-current, or over-temperature condition is detected, heating the resistors 232, 234 and opening fuses 236, 238 (e.g., thermal fuses) may still depend on various parameters that cannot be very precisely controlled. Additionally, the permanent disconnect circuit 230 may be costly to assemble as the resistors 232, 234 and the fuses 236, 238 are often packaged together.

Turning now to FIGS. 3-7, various embodiments providing a secondary protection circuit for protecting a battery pack by providing more precise control of permanently disconnecting the battery pack from the charger and/or the load are illustrated. Said differently, various embodiments are depicted of a secondary protection circuit that is less dependent upon external conditions (e.g., temperature, power supply levels, or the like) to function.

Figure 3:
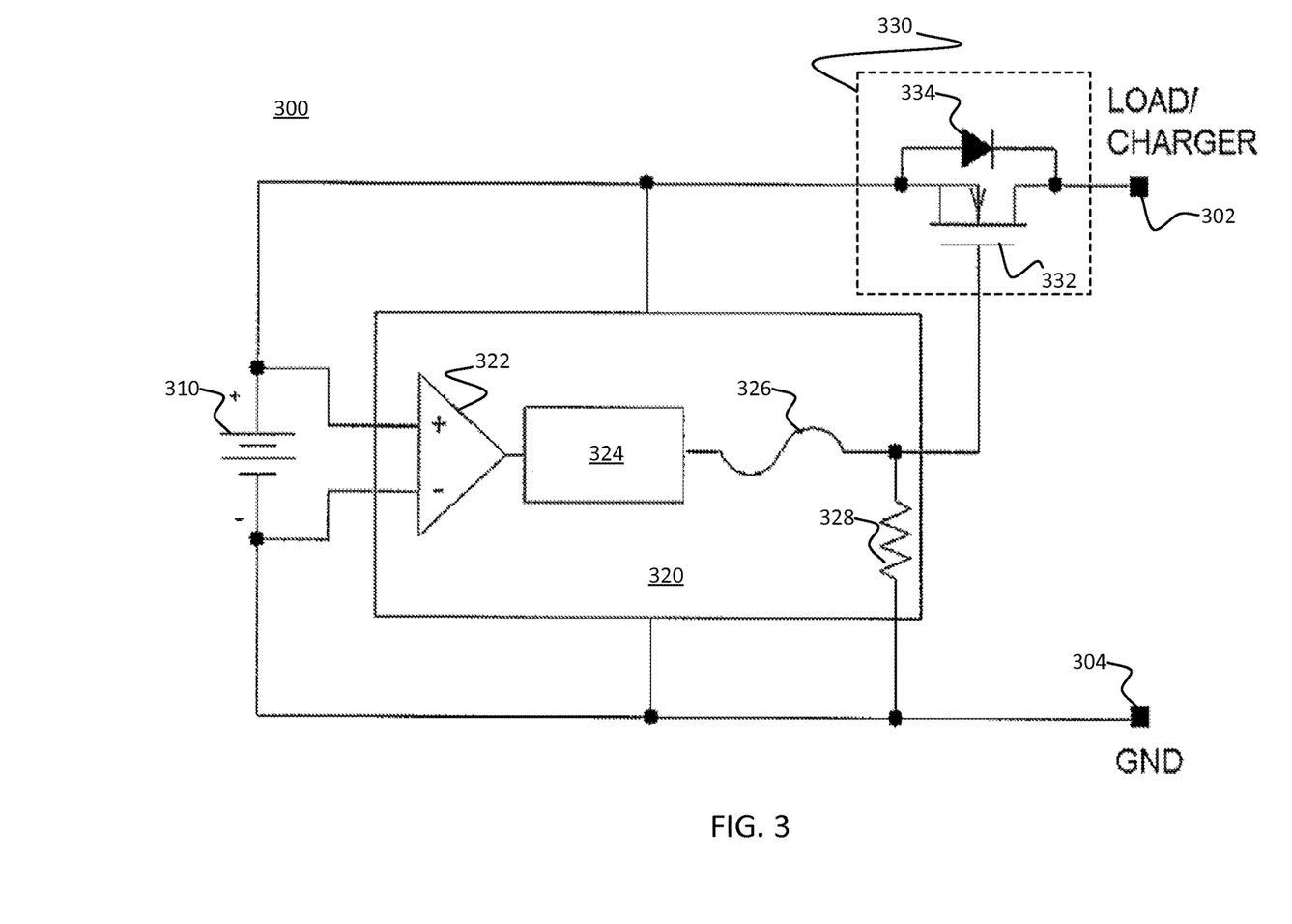
FIGS. 3-6 are block diagrams of example secondary protection circuits, all arranged according to at least some embodiments of the present disclosure.
Figure 4:
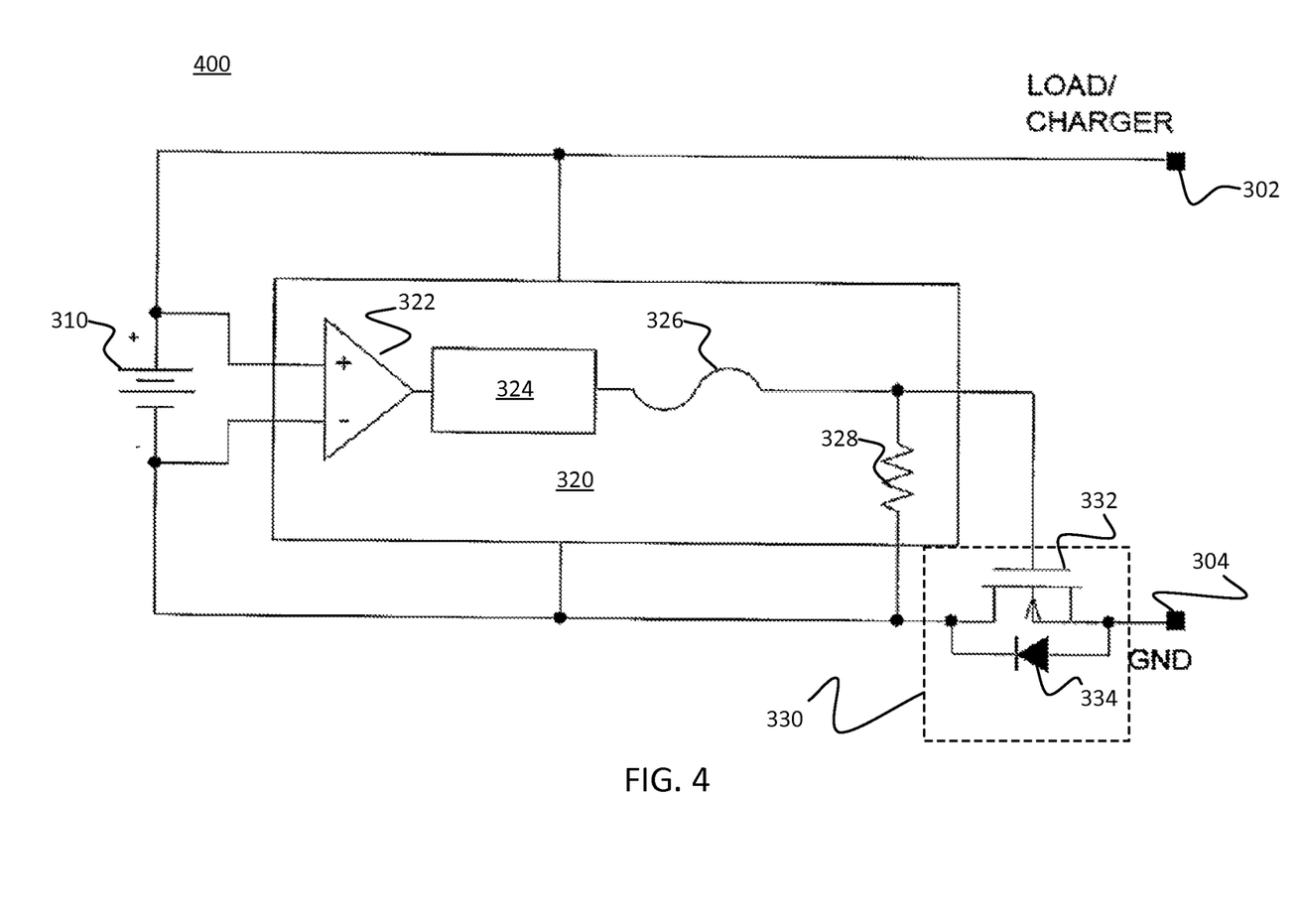
Figure 5:
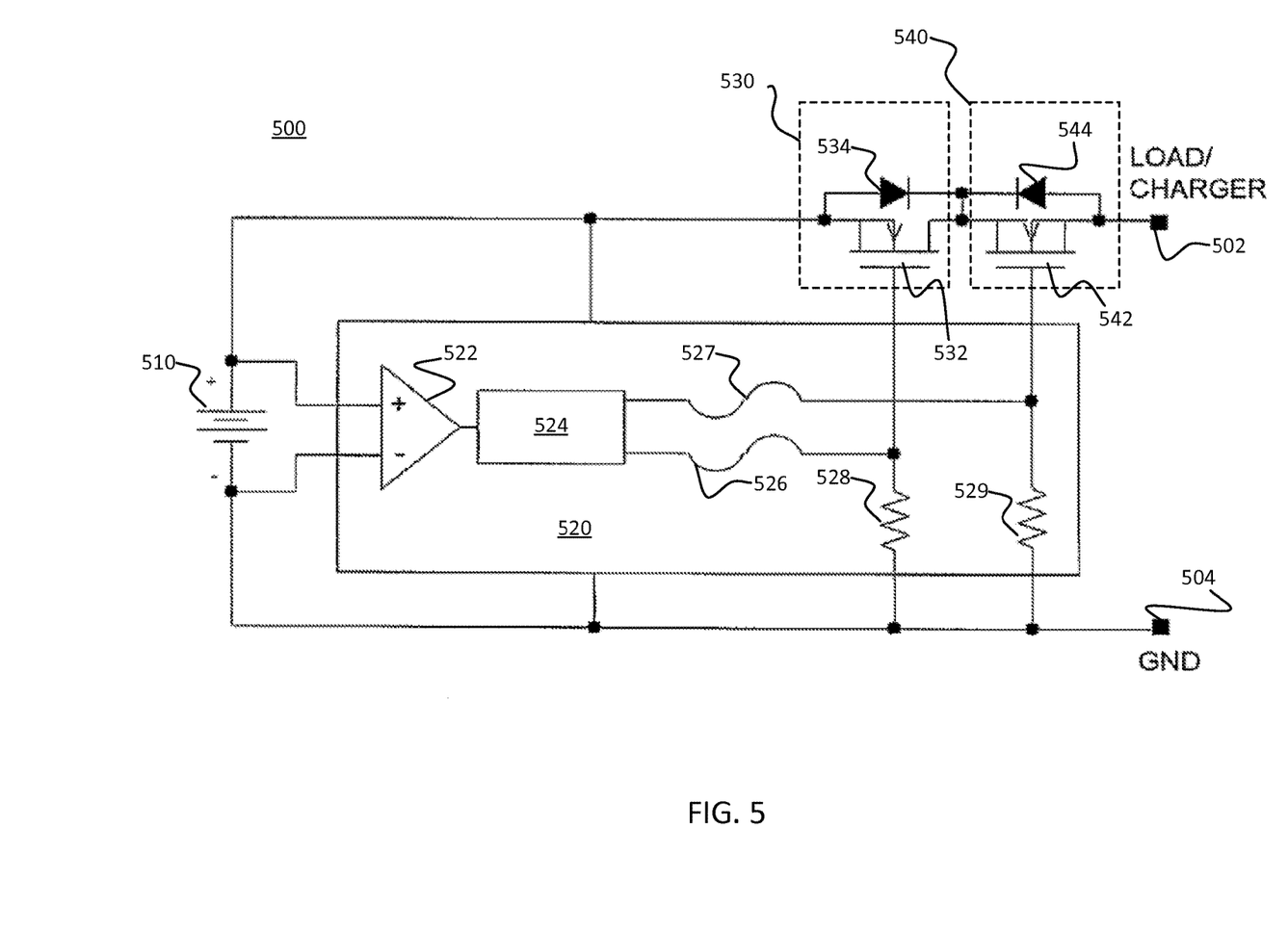
Figure 6:
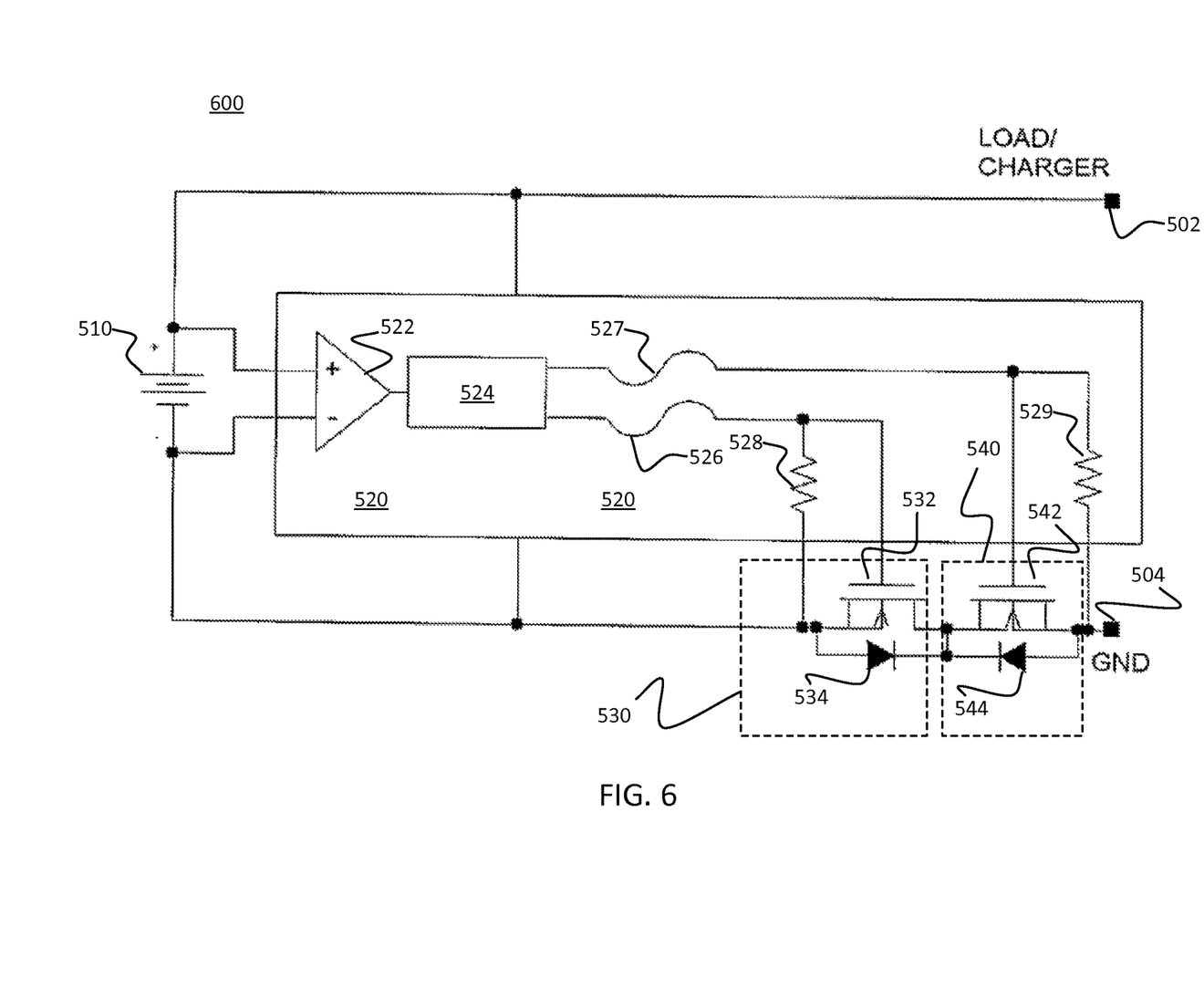
Figure 7:
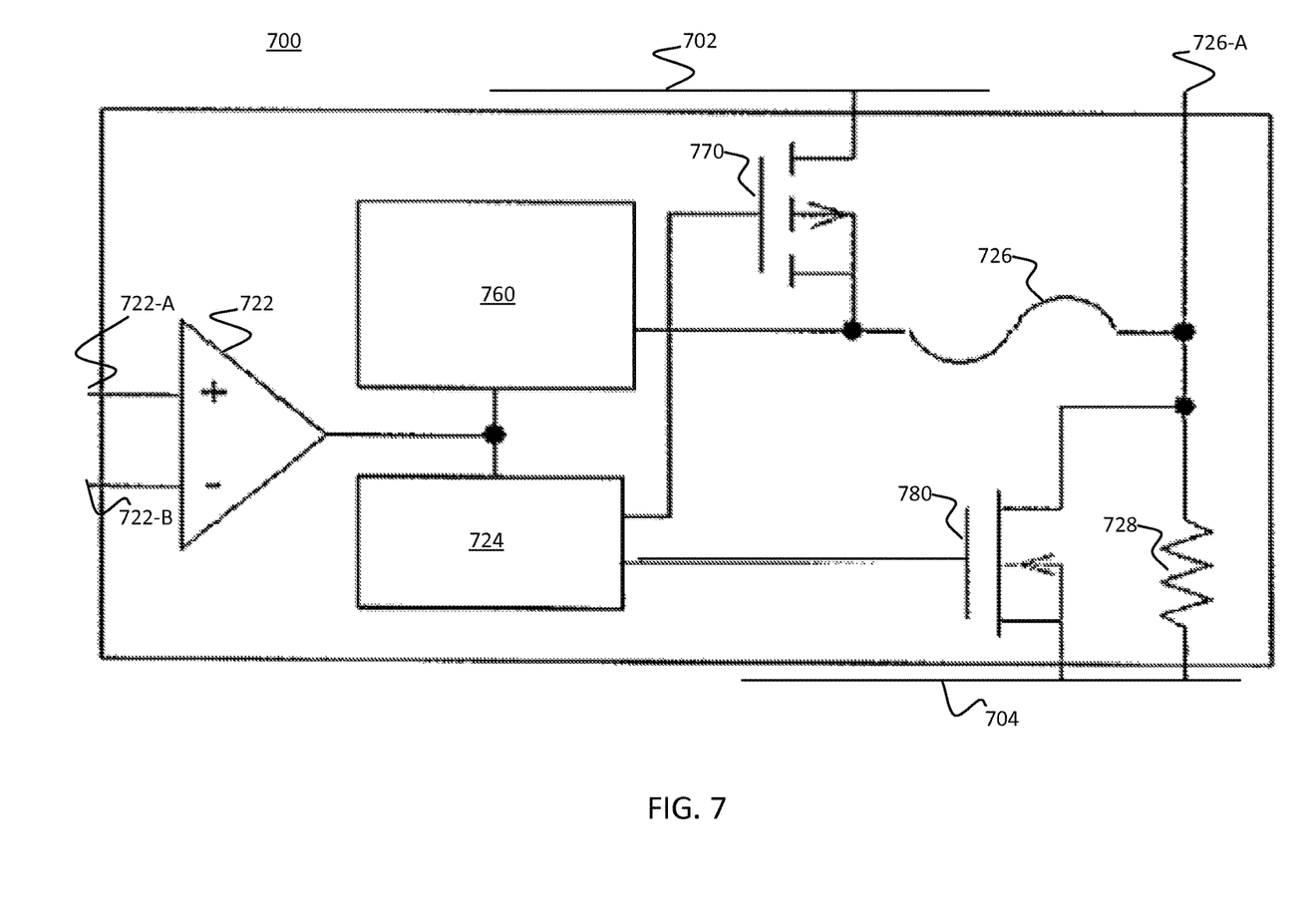
FIG. 7 is a block diagram of a portion of an example secondary protection circuit, arranged according to at least some embodiments of the present disclosure.

More specifically, FIGS. 3-4 illustrate secondary protection circuits configured to protect a battery pack against charging faults (e.g., over-voltage, over-current, over-temperature, or the like) while FIGS. 5-6 illustrate secondary protection circuits configured to protect a battery pack against both charging faults and discharging faults (e.g., under-voltage, over-current, over-temperature, or the like.) FIG. 7 illustrates a portion of a secondary protection circuit. The secondary protection circuits illustrated in FIGS. 3-7 are configured to be able to permanently electrically disconnect the battery pack from a power source (e.g., charger) or a load (e.g., electronic device) to protect a battery pack from entering an unsafe condition.

Turning more specifically to FIG. 3, a block diagram of a secondary protection circuit 300 for protecting a battery pack 310 is illustrated. The secondary protection circuit 300 includes terminals 302 and 304 for electrically connecting the secondary protection circuit 300 into a primary protection circuit. Said differently, the terminal 302 may be used to connect the secondary protection circuit to a charger and/or load and the terminal 304 may be used to connect the secondary protection circuit to ground.

A secondary control IC 320 is provided to control a switch 330 to electrically disconnect the terminal 302 from the battery 310. The switch 330 includes a transistor 332 and a diode 334. The source and drain of the transistor 332 is electrically connected to the terminal 302 and the battery 310. Furthermore, a diode 334 is coupled across the source and the drain of the transistor 332, with the diode 334 blocking current from flowing from the terminal 302 to the battery 310.

The secondary control IC 320 includes a sensor 322 for sensing a fault condition across the battery. It is to be appreciated, that a variety of different sensors and sensing mechanisms for determining a fault condition in the battery may be provided. In general, however, the sensor 322 and the secondary control IC 320 may determine a fault related to charging (e.g., over-voltage, over-current, over-temperature, or the like.) A fuse control circuit 324 and a fuse control circuit 326 are also provided. The fuse control circuit 324 is coupled to the sensor 322 to receive an indication from the sensor of a fault condition. The fuse 326 is electrically coupled to the fuse control circuit 324 and the gate of the transistor 332. Furthermore, a resistor 328 may be electrically coupled between the terminal 304 (e.g., ground) and the gate of the transistor 332. For purposes herein, the term "coupled" along with its derivatives, is intended to indicate that two or more elements are in direct physical or electrical contact with each other or that two or more elements are not in direct contact with each other, but yet still co-operate or interact with each other.

The switch 330 is configured to enable the battery 310 to be permanently electrically disconnected from the terminals 302, 304 when current flows to charge the battery 310. During normal operation (e.g., normal being defined as non-fault conditions), the fuse control circuit 324 provides a high-voltage signal to the gate of the transistor 332, to turn the transistor on, thereby allowing current to flow from the terminal 302 to the battery 310 to charge the battery 310. When an abnormal condition is determined, current sufficient to cause the fuse 326 to open is passed through the fuse 326. The gate of the transistor 332 is now coupled to the terminal 304 (e.g., ground) through the resistor 328. As such, the voltage at the gate is pulled low and the transistor 332 is turned off. As a result, the current path from the terminal 302 to the battery 310 is disabled, thereby interrupting any potentially hazardous charging conditions. It is important to note, that this is a permanent disable of the charging functioning of the battery 310.

It is important to note, that the fuse 326 may be small (e.g., the current carrying capacity, or the like) relative to the current flowing to and from the battery 310. As such, controlling the opening of the fuse 326 may be easier and more reliable than with conventional systems.

Turning more specifically to FIG. 4, an alternative configuration of the secondary protection circuit 300 is shown. Said differently, FIG. 4 illustrates a secondary protection circuit 400, including the components of the secondary protection circuit 300, arranged in alternative manner. More specifically, the secondary protection circuit 400 includes the battery 310 connected between the terminals 302 and 304, the secondary control IC 320, and the switch 330. However, the switch 330 is coupled in series between the battery 310 and the terminal 304 (as opposed to between the battery 310 and the terminal 302 as in the secondary protection circuit 300 of FIG. 3.) Said differently, the switch 330 is connected to the terminal 304 (e.g., ground terminal) instead of the terminal 302 (e.g., positive terminal).

As depicted, the source and drain of the transistor 332 is coupled to the terminal 304 and the battery 310. The gate of the transistor 332 is coupled the same as in FIG. 3. More specifically, the gate is coupled to the fuse control 324 through the fuse 326 and to ground through the resistor 328. As will be appreciated, the operation of the secondary protection circuit 400 is similar to that described above with respect to the secondary protection circuit 300.

Turning more specifically to FIG. 5, a block diagram of a secondary protection circuit 500 for protecting a battery pack 510 is illustrated. The secondary protection circuit 500 includes terminals 502 and 504 for electrically connecting the secondary protection circuit 500 into a primary protection circuit. Said differently, the terminal 502 may be used to connect the secondary protection circuit to a charger and/or load and the terminal 504 may be used to connect the secondary protection circuit to ground.

A secondary control IC 520 is provided to control a switch 530 (e.g., charge switch) and a switch 540 (e.g., discharge switch) to electrically disconnect the terminal 502 from the battery during charging and/or discharging. Each of the switches includes a transistor (e.g., 532, 542) and a diode (e.g., 534, 544.) The switches 530, 540 are coupled between the terminal 502 and the battery 510. The secondary control IC 520 is configured to turn the switches 530, 540 on by applying a high voltage signal to the gate of the transistors (e.g., 532, 542) of each switch to turn the switches on.

The diode 534 in the charge switch 530 is configured to block charging current (e.g., current flowing from the terminal 502 to the battery 510) but allow discharging current (e.g., current flowing from the battery 510 to the terminal 502. Similarly, the diode 544 in the discharge switch 540 is configured to block discharging current but allow charging current.

The secondary control IC 520 includes a sensor 522 for sensing a fault condition across the battery 510. It is to be appreciated, that a variety of different sensors and sensing mechanisms for determining a fault condition in the battery may be provided. In general, however, the sensor 522 and the secondary control IC 520 may determine a fault related to charging (e.g., over-voltage, over-current, over-temperature, or the like) or a fault related to discharging (e.g., under-voltage, over-current, over-temperature, or the like.) The fuse control circuit 524 is coupled to the sensor 522 to receive an indication from the sensor 522 of a fault condition.

A fuse control circuit 524 and fuses 526 and 527 are also provided. The fuse 526 is electrically coupled between the fuse control circuit 524 and the gate of the transistor 532 in the charge switch 530. The fuse 527, which may be an open fuse, is coupled between the fuse control circuit 524 and the gate of the transistor 542 in the discharge switch 540. Furthermore, resistors 528, 529 are electrically coupled between the terminal 504 (e.g., ground) and the gates of the transistors 532, 542, respectively.

The switch 530 (e.g., a charge switch) is configured to enable the battery 510 to be permanently electrically disconnected from the terminals 502, 504 when current flows to charge the battery 510. More specifically, the secondary control IC 520 is configured to cause the switch 530 to be turned permanently off, therefore interrupting the current path necessary to charge the battery. However, as the switch 530 includes the diode 534, a discharge current path (e.g., from the battery to terminal 502) will still be provided when the discharge switch 540 is on.

Similarly, the discharge switch 540 is configured to enable the battery 510 to be permanently electrically disconnected from the terminals 502, 504 when current flows from the battery 510. More specifically, the secondary control IC 520 is configured to cause the switch 540 to be turned permanently off, therefore interrupting the current path necessary to discharge the battery. However, as the switch 540 includes the diode 544, a charge current path (e.g., from the terminal 502 to the battery 510) will still be provided when the charge switch 530 is on.

During normal operation, the fuse control circuit 524 provides a high-voltage signal to the gate of the transistors 532, 542 in order to turn the transistors on, thereby allowing current to flow from the terminal 502 to the battery 510 to charge the battery 510 and from the battery 510 to the terminal 502 to discharge the battery (e.g. power a load).

When an abnormal charge condition is determined, current sufficient to cause the fuse 526 to open is passed through the fuse 526. The gate of the transistor 532 is coupled to the terminal 504 (e.g., ground) through the resistor 528. As such, the voltage at the gate is pulled low and the transistor 532 is turned off. As a result, the current path from the terminal 502 to the battery 510 is disabled thereby interrupting any potential hazardous charging conditions. It is important to note, that this is a permanent disable of the charging functioning of the battery 510.

When an abnormal discharge condition occurs, current sufficient to cause the fuse 527 to open is passed through the fuse 527. The gate of the transistor 542 is now coupled to the terminal 504 (e.g., ground) through the resistor 529. As such, the voltage at the gate is pulled low and the transistor 542 is turned off. As a result, the current path from the battery 510 to the terminal 502 is disabled thereby interrupting any potential hazardous discharging conditions. It is important to note, that this is a permanent disable of the discharging functioning of the battery 510.

Turning more specifically to FIG. 6, an alternative configuration of the secondary protection circuit 500 is shown. Said differently, FIG. 6 illustrates a secondary protection circuit 600, including the components of the secondary protection circuit 500, arranged in alternative manner. More specifically, the secondary protection circuit 600 includes the battery 510 connected between the terminals 502 and 504, the secondary control IC 520, the switches 530, 540. However, the switches 530, 540 are coupled in series between the battery 510 and the terminal 504 (as opposed to between the battery 510 and the terminal 502 as in the secondary protection circuit 500 of FIG. 5.) Said differently, the switches 530, 540 are connected to the ground terminal 504 instead of the positive terminal 502.

As depicted, the source and drain of the transistors 532, 542 are coupled to the terminal 504 and the battery 510. The gates of the transistors 532, 542 are coupled the same as in FIG. 5. More specifically, the gates are coupled to the 524 through the fuses 526, 527 and to ground through the resistors 528, 529. As will be appreciated, the operation of the secondary protection circuit 600 is similar to that described above with respect to the secondary protection circuit 500.

Turing more specifically to FIG. 7, an example of a secondary control IC 700 is illustrated. The secondary control IC 700 is configured to provide secondary protection for either charge (e.g., the switch 330, the switch 530, or the like) or discharge (e.g., the switch 540.) It is to be appreciated, that this is not intended to be limiting, and instead is done for purposes of clarity and ease of understanding.

The secondary control IC 700 includes a sensor 722 having terminals 722-A and 722-B for connecting the sensor 722 to a battery to monitor the battery for fault conditions. Additionally, the secondary control IC 700 includes a fuse 726 and a resistor 728 for coupling to the gate of a transistor in a switch (e.g., the transistor 332, 532, or the like) that is to be permanently closed to disconnect a battery from a charger or a load. A terminal 726-A is provided to couple the fuse 726 and the resistor 728 to the gate of the transistor in the switch. Additionally, a power rail 702 and a ground rail 704 are provided for connecting the secondary control IC 700 to power and ground. The secondary control IC also includes transistor driver 760 (e.g., a driver circuit, a charge pump, or the like) to provide a high voltage signal to the terminal 726-A to turn the transistor on. Fuse shorting transistors 770, 780 are also provided to short the fuse 726 between the power rail 702 and the ground rail 704 to cause the fuse 726 to open. More specifically, when an abnormal condition is detected, the fuse control circuit 724 may turn the fuse shorting transistors 770, 780 on causing a high current to flow from the power rail 702, through the transistor 770, the fuse 726, the transistor 780, and to the ground rail 704. Such high current will quickly cause the fuse 726 to open, thereby disabling the transistor driver 760 from turning the transistor connected to the terminal 726-A on.

As noted above, the secondary control IC 700 is shown configured to provide permanent disconnection features for a single switch for convenience and clarity of presentation. This is not intended to be limiting. For example, the secondary control IC 700 may be configured with multiple pairs of shorting transistors to provide disconnect features (e.g., opening fuses 526, 527, or the like) for multiple switches thereby reducing dependence on temperature and power supply effects in a current limiting circuit.

Figure 8:
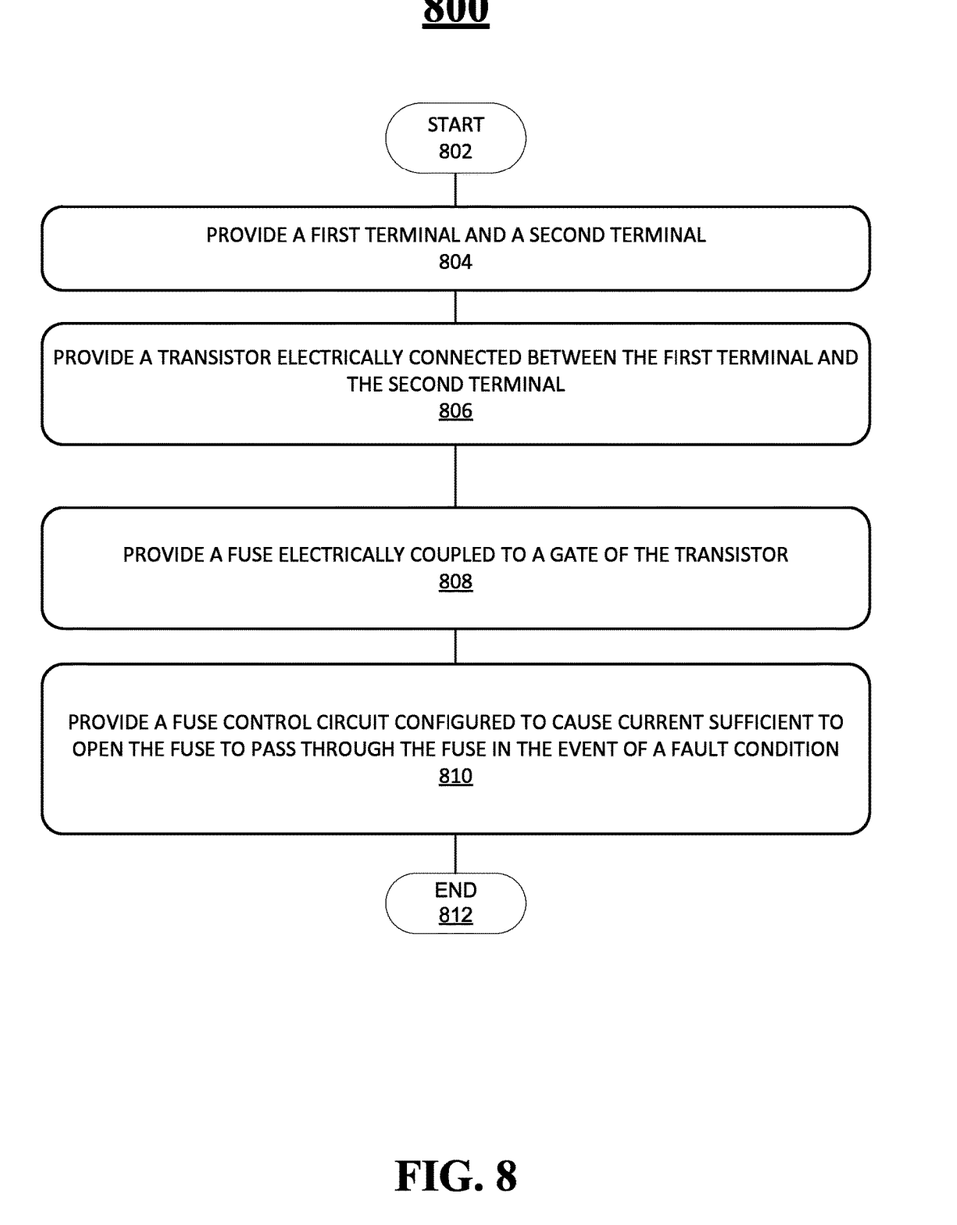
FIG. 8 illustrates a flow diagram of an embodiment of a method of manufacturing the secondary protection circuit device in accordance with the present disclosure.

FIG. 8 is a flow diagram of a method for manufacturing 800 a secondary protection circuit for protecting a battery pack in accordance with an embodiment of the present disclosure. For example, by way of illustration only, the method of manufacturing 800 of FIG. 8 may be used to manufacture the secondary protection circuit 300, the secondary protection circuit device 400, and/or the secondary protection circuit device 700. The method of manufacturing 800 begins at block 802. The method of manufacturing 800 moves to block 804. At block 804, a first terminal and a second terminal are provided at block 804. A transistor is provided and electrically connected between the first terminal and the second terminal at block 806. The method of manufacturing 800 provides a fuse electrically coupled to the gate of the transistor at block 808. The method of manufacturing 800 provides a fuse control circuit configured to cause a current sufficient to open the fuse in the event of a fault condition at block 810. The method of manufacturing 800 may end at block 812.

Figure 9:
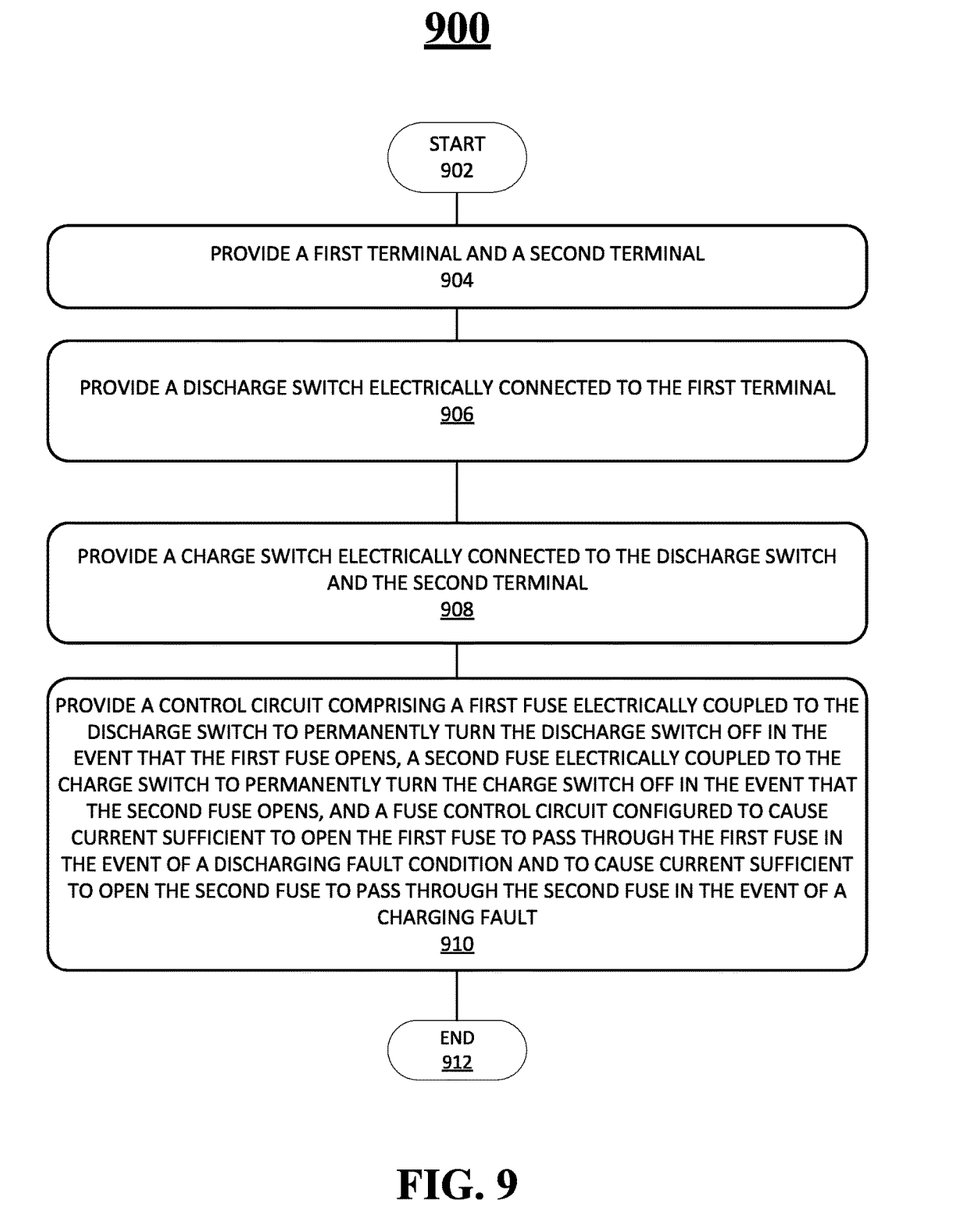
FIG. 9 illustrates a flow diagram of an additional embodiment of a method of manufacturing a secondary protection circuit device in accordance with the present disclosure.

FIG. 9 is a flow diagram of a method for manufacturing 900 a secondary protection circuit for protecting a battery pack in accordance with an embodiment of the present disclosure. For example, by way of illustration only, the method of manufacturing 900 of FIG. 9 may be used to manufacture the secondary protection circuit device 500 and/or the secondary protection circuit device 600. The method of manufacturing 900 begins at block 902. The method of manufacturing 900 moves to block 904. At block 904, a first terminal and a second terminal are provided at block 904. The method of manufacturing 900 provides a discharge switch electrically connected to the first terminal at block 906. The method of manufacturing 900 provides a charge switch electrically connected to the discharge switch and the second terminal at block 908. The method of manufacturing 900 provides a control circuit comprising a first fuse electrically coupled to the discharge switch to permanently turn the discharge switch off in the event that the first fuse opens; a second fuse electrically coupled to the charge switch to permanently turn the charge switch off in the event that the second fuse opens; and a fuse control circuit configured to cause current sufficient to open the first fuse to pass through the first fuse in the event of a discharging fault condition and to cause current sufficient to open the second fuse to pass through the second fuse in the event of a charging fault at block 910. The method of manufacturing 900 may end at block 912.

Figure 10:
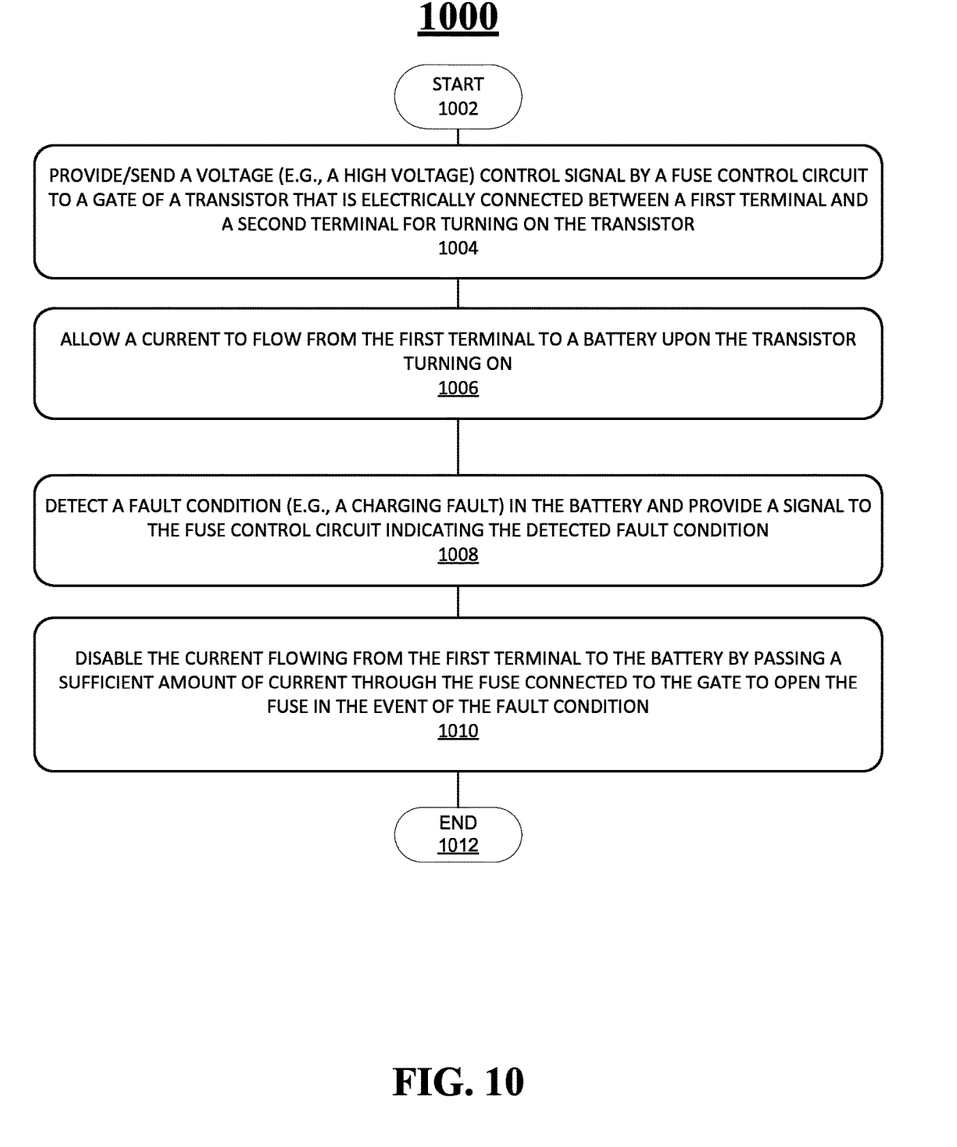
FIG. 10 illustrates a flow diagram of an embodiment of a method of operation of a secondary protection circuit device in accordance with the present disclosure.

FIG. 10 is a flow diagram of a method of operation 1000 for a secondary protection circuit for protecting a battery pack in accordance with an embodiment of the present disclosure. The method of operation 1000 begins at block 1002. The method of operation 1000 moves to block 1004. The method of operation 1000 provides a voltage signal (e.g., a high voltage signal) by a fuse control circuit to a gate of a transistor that is electrically connected between a first terminal and a second terminal for turning on the transistor at block 1004.

The method of operation 1000 allows a current to flow from the first terminal to a battery upon the transistor turning on at block 1006. The method of operation 1000 detects a fault condition in the battery and providing a signal to a fuse control circuit indicating the fault condition was detected at block 1008. In one embodiment, the method of operation 1000 may use a sensor operably coupled to the fuse control circuit to detect one or more charging faults in the battery and the one or more charging faults are selected from the group comprising of over-voltage, over-current, and over-temperature.

The method of operation 1000 disables the current flowing from the first terminal to the battery by passing a sufficient amount of the current through a fuse connected to the gate to open the fuse in the event of a fault condition using the fuse control circuit at block 1010. In one embodiment the current is blocked from flowing from the first terminal to the battery via a diode electrically coupled across a source and a drain of the transistor. The method of operation 1000 may end at block 1012.

Thus, as described herein, the present disclosure provides significant improvement and benefit by protecting a battery pack with greater efficiency and more precise control of permanently disconnecting the battery pack from the charger and/or the load. Said differently, the present disclosure provides a secondary protection circuit that is less dependent upon external conditions (e.g., temperature, power supply levels, or the like) to function, such as reducing dependence on temperature and power supply effects in a current limiting circuit since a voltage drop across a resistor may be measured more accurately, even with variations in temperature and power supply levels.

In one embodiment, the secondary battery protection circuit protects a battery from charging and/or discharging faults. The secondary battery protection circuit may include a first terminal and a second terminal, a transistor electrically connected between the first terminal and the second terminal, a fuse electrically coupled to the gate of the transistor, and a fuse control circuit configured to cause current sufficient to open the fuse to pass through the fuse in the event of a fault condition. The secondary battery protection circuit includes a sensor operably coupled to the fuse control circuit, the sensor configured to detect the fault condition in a battery to be protected by the secondary battery protection circuit and provide a signal to the fuse control circuit indicating the fault condition was detected. The first terminal is configured to be connected to a battery to be protected and the second terminal is configured to be connected to a battery charging circuit, the sensor further operably coupled to the first terminal and configured to detect one or more charging faults. The one or more charging faults are selected from the group comprising of over-voltage, over-current, and over-temperature. The secondary battery protection circuit further comprises a diode electrically coupled across a source and a drain of the transistor, and a resistor electrically coupled between the gate of the transistor and ground. The secondary battery protection circuit further comprises a third terminal, wherein the first terminal is configured to be connected to a battery to be protected, the second terminal is configured to be connected to ground, and the third terminal is configured to be connected to a battery charging circuit.

Said differently, the first terminal is configured to be connected to a battery to be protected and the second terminal is configured to be connected to a battery charging circuit, the first sensor configured to detect one or more charging faults between the battery and a battery charger.

While the present disclosure has been disclosed with reference to certain embodiments, numerous modifications, alterations and changes to the described embodiments are possible without departing from the sphere and scope of the present disclosure, as defined in the appended claims. Accordingly, it is intended that the present disclosure not be limited to the described embodiments, but that it has the full scope defined by the language of the following claims, and equivalents thereof.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A secondary battery protection circuit comprising:
   a first terminal and a second terminal;
   a first transistor electrically connected between the first terminal and the second terminal;
   a fuse electrically coupled to a gate of the first transistor;
   a power rail connected to a current source;
   a second transistor electrically connected between the power rail and the fuse;
   a fuse control circuit connected to the first transistor and the second transistor and configured to:
      provide a signal to the first transistor to turn the first transistor on, and
      provide a signal to the second transistor to turn the second transistor on to cause current sufficient to open the fuse to pass from the power rail through the fuse in an event of a fault condition; and
   a sensor operably coupled to the fuse control circuit, the sensor configured to detect the fault condition in a battery to be protected by the secondary battery protection circuit and provide a signal to the fuse control circuit indicating the fault condition was detected;
   wherein in a charging fault the fuse control circuit is configured to at least one of: prevent charging current to the battery while allowing discharge current to flow; or prevent discharge current while allowing charging current to flow; or both.

2. The secondary battery protection circuit of claim 1, wherein the first terminal is configured to be connected to the battery to be protected and the second terminal is configured to be connected to a battery charging circuit, the sensor further operably coupled to the first terminal and configured to detect one or more charging faults.

3. The secondary battery protection circuit of claim 2, wherein the one or more charging faults are selected from the group consisting of over-voltage, over-current, and over-temperature.

4. The secondary battery protection circuit of claim 1, further comprising a diode electrically coupled across a source and a drain of the transistor.

5. The secondary battery protection circuit of claim 1, further comprising a resistor electrically coupled between the gate of the transistor and ground.

6. A secondary battery protection circuit comprising:
   a first terminal and a second terminal;
   a discharge switch electrically connected to the first terminal;
   a charge switch electrically connected to the discharge switch and the second terminal;
   a power rail connected to a current source;
   a control circuit comprising:
      a first fuse electrically coupled to the discharge switch to permanently turn the discharge switch off in the event that the first fuse opens;
      a second fuse electrically coupled to the charge switch to permanently turn the charge switch off in an event that the second fuse opens;
      a first transistor electrically connected between the power rail and the first fuse;
      a second transistor electrically connected between the power rail and the second fuse;
      and
      a fuse control circuit configured to:
         determine whether a fault condition is a discharging fault condition or a charging fault condition, provide a signal to the first transistor to turn the first transistor on to cause current sufficient to open the first fuse to pass from the power rail through the first fuse in the event of the discharging fault condition to disable discharging operations of a battery to be protected by the secondary battery protection circuit, and provide a signal to the second transistor to turn the second transistor on to cause current sufficient to open the second fuse to pass from the power rail through the second fuse in the event of the charging fault condition to disable charging operations of the battery; and
   a sensor operably coupled to the fuse control circuit, the sensor configured to detect the fault condition in the battery to be protected by the secondary battery protection circuit and provide a signal to the fuse control circuit indicating the fault condition was detected;
   wherein the charge switch is configured to turn off by the fuse control circuit to interrupt a charge current path while allowing a discharge current path for the discharge switch, and the discharge switch is configured to turn off by the fuse control circuit to interrupt the discharge current path while allowing the charge current path for the charge switch.

7. The secondary battery protection circuit of claim 6, wherein the first terminal is configured to be connected to the battery to be protected and the second terminal is configured to be connected to a battery charging circuit, the sensor configured to detect one or more charging faults between the battery and a battery charger.

8. The secondary battery protection circuit of claim 7, wherein the one or more charging faults are selected from the group comprising of over-voltage, over-current, and over-temperature.

9. The secondary battery protection circuit of claim 6, wherein the first terminal is configured to be connected to the battery to be protected and the second terminal is configured to be connected to a load, the sensor configured to detect one or more discharging faults between the battery and the load.

10. The secondary battery protection circuit of claim 9, wherein the one or more discharging faults are selected from the group comprising of under-voltage, over-current, and over-temperature.

11. The secondary battery protection circuit of claim 6, the charging switch comprising a transistor and a diode electrically coupled across a source and a drain of the transistor.

12. The secondary battery protection circuit of claim 11, wherein the transistor is a first transistor, the diode is a first diode, the discharging switch comprising a second transistor and a second diode electrically coupled across a source and a drain of the second transistor.

13. The secondary battery protection circuit of claim 12, further comprising a first resistor electrically coupled between a gate of the first transistor and ground and a second resistor electrically coupled between the gate of the second transistor and ground.

14. The secondary battery protection circuit of claim 6, wherein the fuse control circuit is configured to cause the charge switch to be turned off permanently to interrupt the charge current path to charge the battery while allowing the discharge current to flow.

15. The secondary battery protection circuit of claim 6, wherein the fuse control circuit is configured to cause the discharge switch to be turned off permanently to interrupt the discharge current path to discharge the battery while allowing the charge current to flow.

* * * * *